SYSTEM FOR RECORDING PARALLEL X-RAYS

Filed Sept. 29, 1960

FORMATION OF A REAL POINT SOURCE

FORMATION OF A VIRTUAL POINT SOURCE

INVENTOR
LA VERNE S. BIRKS, JR.

Melvin L. Crane AGENT

BY Richard C. Reed ATTORNEY

United States Patent Office 3,079,501

Patented Feb. 26, 1963

3,079,501

SYSTEM FOR RECORDING PARALLEL X-RAYS

La Verne S. Birks, Jr., Takoma Park, Md., assignor to the United States of America, as represented by the Secretary of the Navy Filed Sept. 29, 1960, Ser. No. 59,462
6 Claims. (Cl. 250—51.5)
(Granted under Title 35, U.S. Code (1952), sec. 266)

The invention described herein may be manufactured and used by or for the Government of the United States of America for governmental purposes without the payment of any royalties thereon or therefor.

The present invention is related to means for photographing X-rays and more particularly to a device for photographing parallel X-rays especially those radiations of solar or stellar origin.

There exists today many types of equipment for photographing X-rays originating from a tube in which the X-rays emanating therefrom scatter in every direction. Photographing such X-rays requires special shielding equipment to present an exit pupil for the desired X-radiation and since the X-rays exit in different directions from a point source the rays can be directed such that they are easily photographed. With the advent of upper air research and studies of the solar system, there has been a long desire to effectively photograph X-rays produced by the solar system. Solar X-rays are known to be parallel radiation when they near the earth. In order to be photographed efficiently, this radiation must be focused to yield a point or line source. Since X-radiation is unlike light, this radiation cannot be focused to a point or line source by refraction.

It is therefore an object of the present invention to provide a device for photographing solar X-rays near the earth.

Another object is to provide a device for producing a point source from parallel X-rays.

Still another object is to provide a device for photographing X-rays emanating as parallel radiation.

Other objects and advantages of the invention will hereinafter become more fully apparent from the following description of the annexed drawings which illustrate the preferred embodiments, and wherein.

It has been determined that parallel X-rays incident on a surface may be reflected from glass or metal surfaces if they strike the surface at near grazing incidence of about 5 degrees or less. In order to photograph parallel solar X-rays it is necessary to produce a point source of these parallel rays. The only surface which will yield a point source by reflection is a paraboloid of revolution. Parallel X-rays having a grazing angle of incidence of 5 degrees or less on the concave side of the surface will form a real point source and when such X-rays are incident on the convex side they will yield a virtual point source. Thus the incident parallel X-rays will have a point source at the focal point of the paraboloid of revolution; that is, when the radiation incident on the surface strikes the surface from a direction such that the reflected rays pass through the focal point, incident parallel X-rays can be reflected by the surface to a curved diffraction grating or a curved crystal of suitable spacing and then imaged onto a photographic means where the X-rays are photographed.

Figure 1:
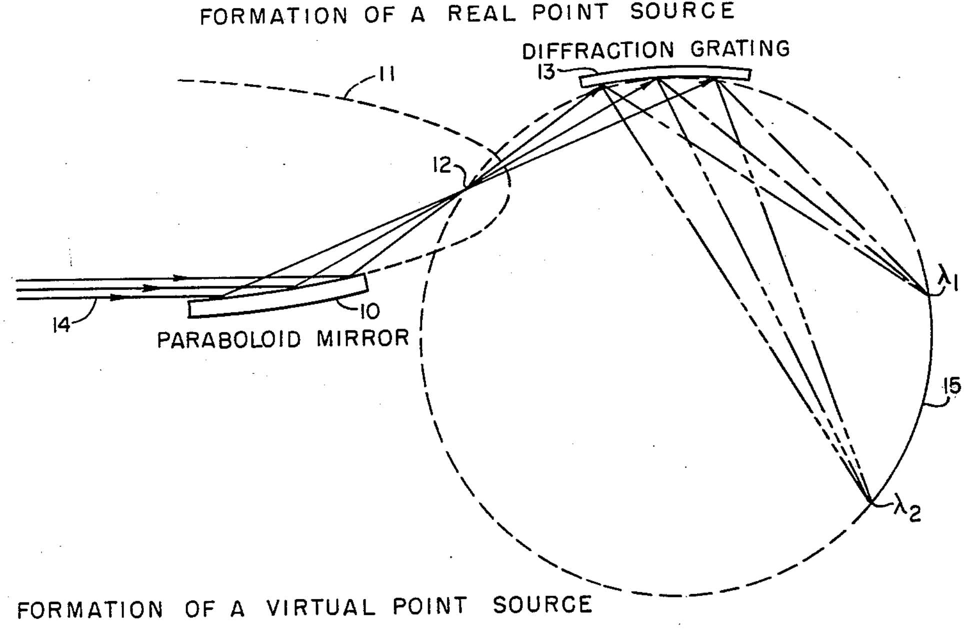
FIG. 1 is a diagrammatic view of an embodiment of the invention illustrating the basic elements of the invention.

Now referring to the drawings, there is shown by illustration in FIG. 1 an embodiment made in accordance with the teaching of the present invention. As illustrated, mirror 10 is a section of a paraboloid of revolution shown by dotted line 11 having a focal point 12. On the opposite side of the paraboloid and the focal point from the mirror 10, a curved diffraction grating 13 is positioned with the concave side facing the concave side of mirror 10 in such a manner that radiation reflected from the mirror will pass through the focal point of the paraboloid and then will be received by the concave side of the curved diffraction grating. A photographic film or any other suitable equipment is positioned relative to the diffraction grating to record the spectra of any X-radiation incident on the mirror at a grazing angle of incidence of about 5 degrees or less and reflected through the focal point of the paraboloid onto the diffraction grating which is imaged onto the film by the diffraction grating.

In operation, parallel X-radiation is incident on the mirror 10 (from the left as shown in the drawing) which reflects the radiation into a converging pattern through the focal point of the paraboloid of revolution to form a point source at the focal point. The radiation then continues in a diverging pattern to the curved diffraction grating 13. The radiation incident onto the concave surface of the grating is then imaged onto the recording film which records the spectra of the parallel X-radiation incident on the mirror 10.

Figure 2:
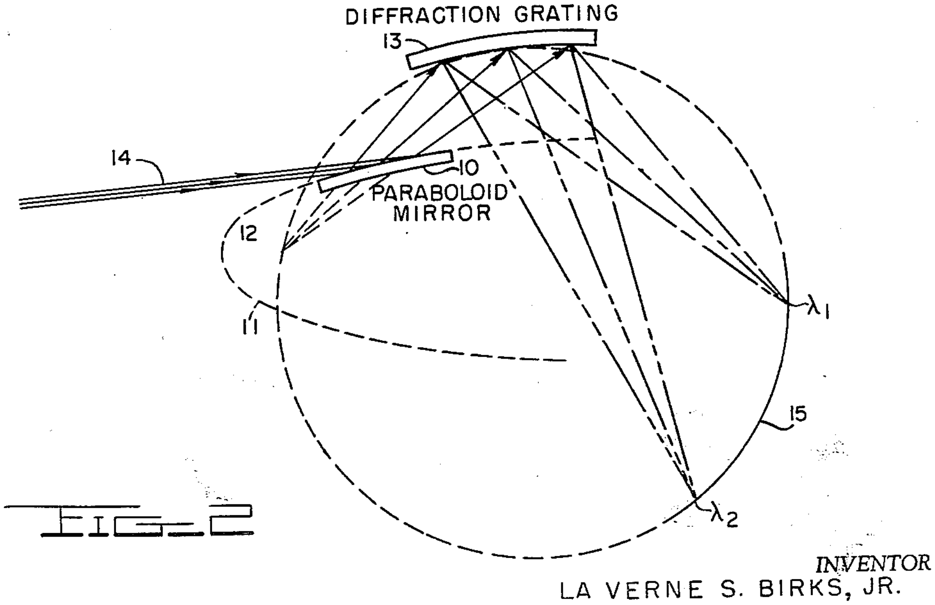
FIG. 2 is a modification of the embodiment shown by illustration in FIG. 1.

FIG. 2 illustrates the same parts as described above for FIG. 1 only the arrangement is different wherein the convex surface of the mirror forms the reflecting surface and the mirror is positioned between the focal point of the paraboloid of revolution and the diffraction grating 13. In this modification the parallel rays of X-radiation are incident on the convex side of the mirror such that the rays diverge on reflection therefrom and forms a virtual point source at the focal point of the paraboloid of revolution. Thus the parallel rays appearing from the apex end are incident on the surface of the mirror and reflected as diverging rays to the diffraction grating 13. The diffraction grating then images the spectra onto the photographic film or other suitable equipment positioned to receive the reflected spectra from the diffraction grating.

Either of the above described arrangements are satisfactory to record the spectra of parallel rays of X-radiation; however, the arrangement of FIG. 2 is more convenient because the parabolic reflector can be placed closer to the curved diffraction grating. This is only more convenient if a saving in space is necessary. Insofar as photographing parallel rays of X-radiation is concerned, the performance of each of the devices are equal.

Obviously, many modifications and variations of the present invention are possible in the light of the above teachings. It is therefore to be understood that within the scope of the appended claims the invention may be practiced otherwise than as specifically described.

What is claimed is:

1. A system for recording the spectra of a solar source of parallel rays of X-radiation which comprises a parabolic reflector formed from a paraboloid mirror surface and positioned to receive a solar source of incident parallel X-radiation at an angle of incidence of about 5 degrees or less, a curved diffraction grating positioned relative to said parabolic reflector to receive divergent X-radiation reflected by said mirror surface, and recording means positioned relative to said diffraction grating to record the spectra imaged from said diffraction grating.

2. A device for producing a point source from a solar source of parallel X-rays which comprises a parabolic reflector formed from a paraboloid mirrored surface and positioned to receive incident X-radiation at an angle of incidence from about 5 degrees or less and to reflect said incident X-radiation as converging radiation to a point source at the focal point of the paraboloid from which said parabolic reflector is made.

3. A device as claimed in claim 2 wherein said parabolic reflector is positioned to receive said incident X-radiation on the concave surface thereof.

4. A device for producing a point source from a solar source of parallel X-rays which comprises a parabolic reflector formed from a paraboloid mirrored surface and positioned to receive incident X-radiation on the convex side thereof at an angle of incidence from about 5 degrees or less and to reflect said incident X-radiation into diverging rays such that a virtual point source is formed at the focal point of the paraboloid from which said parabolic reflector is made.

5. A system for recording the spectra of a solar source of parallel X-rays which comprises a parabolic reflector formed from a paraboloid mirrored surface and positioned to receive incident X-radiation on the concave surface thereof at an angle of incidence from about five degrees or less, said parabolic reflector reflecting said incident X-radiation in a converging pattern through the focal point of the paraboloid, a curved diffraction grating positioned to receive said X-radiation reflected by said parabolic reflector and recording means positioned relative to said diffraction grating to record the spectra imaged from said diffraction grating.

6. A system for recording the spectra of a solar source of parallel X-radiation which comprises a parabolic reflector formed from a paraboloid mirrored surface and positioned to receive incident X-radiation on the convex surface at an angle of incidence of about five degrees or less, said parabolic reflector reflecting said incident X-radiation in a diverging pattern with a virtual point source at the focal point of said paraboloid, a curved diffraction grating positioned to receive said X-radiation reflected by said parabolic reflector and recording means positioned relative to said diffraction grating to record the spectra imaged from said diffraction grating.

References Cited in the file of this patent

UNITED STATES PATENTS

| | | |
|---|---|---|
| 2,474,240 | Friedman | June 28, 1949 |
| 2,557,662 | Kirkpatrick | June 19, 1951 |
| 2,559,972 | Kirkpatrick | July 10, 1951 |
| 2,688,094 | Dumond | Aug. 31, 1954 |
| 2,805,342 | Lang | Sept. 3, 1957 |
| 2,835,820 | Birks | May 20, 1958 |
| 2,941,078 | Montel | June 14, 1960 |

OTHER REFERENCES

"X-Ray Diffraction Procedures," Klug and Alexander, Wiley, New York, 1954, pages 212, 213.